US008280139B2

(12) United States Patent
Kiyuna (10) Patent No.: US 8,280,139 B2
(45) Date of Patent: Oct. 2, 2012

(54) CELL FEATURE AMOUNT CALCULATING APPARATUS AND CELL FEATURE AMOUNT CALCULATING METHOD

(75) Inventor: Tomoharu Kiyuna, Tokyo (JP)

(73) Assignee: NEC Corporation, Tokyo (JP)

( * ) Notice: Subject to any disclaimer, the term of this patent is extended or adjusted under 35 U.S.C. 154(b) by 655 days.

(21) Appl. No.: 12/449,515

(22) PCT Filed: Feb. 5, 2008

(86) PCT No.: PCT/JP2008/000138
§ 371 (c)(1),
(2), (4) Date: Aug. 12, 2009

(87) PCT Pub. No.: WO2008/099580
PCT Pub. Date: Aug. 21, 2008

(65) Prior Publication Data
US 2010/0098317 A1 Apr. 22, 2010

(30) Foreign Application Priority Data
Feb. 13, 2007 (JP) ................................. 2007-032490

(51) Int. Cl.
*G06K 9/00* (2006.01)
(52) U.S. Cl. ........................................ 382/133; 382/203
(58) Field of Classification Search .......... 382/128–134, 382/203; 702/19–21
See application file for complete search history.

(56) References Cited

U.S. PATENT DOCUMENTS
7,136,540 B2 11/2006 Kiyuna
7,689,038 B2 * 3/2010 Zahniser ...................... 382/180

2004/0071328 A1 * 4/2004 Vaisberg et al. ............... 382/129
2006/0274946 A1 * 12/2006 Karlsson ....................... 382/199
2009/0297015 A1 * 12/2009 Jetzek ............................ 382/133

FOREIGN PATENT DOCUMENTS
JP 2000-331143 11/2000
(Continued)

OTHER PUBLICATIONS

P. Perner, "Classification of HEp-2 Cells Using Fluorescent Image Analysis and Data Mining", Lecture Notes in Computer Science vol. 2199 (Medical Data Analysis), 2001 Nen, pp. 219-224.

(Continued)

*Primary Examiner* — Gerald J. O'Connor
*Assistant Examiner* — Jonathan K Ng
(74) *Attorney, Agent, or Firm* — McGinn IP Law Group, PLLC (57) ABSTRACT

A cell feature amount calculating apparatus is provided that is capable of capturing the state of nuclear DNA. This cell feature amount calculating apparatus includes an image input unit that inputs an image of a cell, a cell nucleus region extracting unit that extracts a cell nucleus region of the cell from the image, a standard contour length calculating unit that calculates a standard contour length of the cell nucleus region, a contour length sequence calculating unit that extracts, for each threshold value of a plurality of different threshold values, a specific region which is a region having a pixel value larger than or equal to the threshold value from the cell nucleus region and calculating a contour length sequence by calculating a contour length of the specific region, and a contour complexity calculating unit that calculates a feature amount of the cell based on the standard contour length and the contour length sequence.

22 Claims, 10 Drawing Sheets

FOREIGN PATENT DOCUMENTS

| | | |
|---|---|---|
| JP | 2002-142800 | 5/2002 |
| JP | 2003-303344 | 10/2003 |
| JP | 2005-227097 | 8/2005 |

OTHER PUBLICATIONS

Y. Hirose, et al., "Electron Microscopic Morphometry of Chronic Type Lymphoid Leukemias", Medical Electron Microscopy vol. 26, No. 1, 1993 Nen 8 Gatsu pp. 29-39.

M. Kass, et al., "Snakes: Active Contour Models," International Journal of Computer Vision, pp. 321-331, 1988.

Japanese Office Action dated Jun. 5, 2012, with English translation.

Hirose, et al., "Electron Microscopic Morphometry of Chronic Type Lymphoid Leukemias", Medical Electron Microscopy, vol. 26, No. 1, Aug. 1998, pp. 29-39 [doi: 10.2007/BF0238833].

Perner, "Classification of HEp-2 Cells Using Fluorescent Image Analysis and Data Mining", Lecture Notes in Computer Science, vol. 2199 [Medical Data Analysis], 2001, pp. 219-224 [doi: 10.1007/3-540-45497-7].

* cited by examiner

CELL FEATURE AMOUNT CALCULATING APPARATUS AND CELL FEATURE AMOUNT CALCULATING METHOD

TECHNICAL FIELD

The present invention relates to a cell feature amount calculating apparatus and a cell feature amount calculating method.

BACKGROUND ART

Conventionally, as an apparatus or a method for calculating features of a cell based on image information, there is, for example, a "cell image analysis apparatus" disclosed in Patent Document 1 (Japanese Patent Application Laid-Open No. 2005-227097). In Patent document 1, it is intended to calculate the total number of cells, the center of the cell nucleus, the cell membrane, and the like as feature amounts based on the microscopic images obtained by capturing images of a plurality of cells. For example, in Patent Document 1, the center of the cell is inferred as follows. First, the boundary between the cell and other substances is emphasized by image processing, and the boundary is detected by performing a binalizing process on the images that have been subjected to the emphasizing process. Thereafter, the feature amount at the coordinates of each point within the boundary is extracted, and a threshold value is set for the extracted feature amount. Next, feature points are extracted based on the set threshold value, and the neighboring points thereof are gathered to extract (a candidate of) the center point.

Here, as related art documents related to the present invention, cited are Patent Document 2 (Japanese Patent Application Laid-Open No. 2003-303344) and a Non-Patent Document 1 (M. Kass, A. Witkin and D. Terzopoulos, "Snakes: Active Contour Models," International Journal of Computer Vision pp. 321-331, 1988.) in addition to Patent Document 1.

[Patent Document 1] Japanese Patent Application Laid-Open No. 2005-227097

[Patent Document 2] Japanese Patent Application Laid-Open No. 2003-303344

[Non-Patent Document 1] M. Kass, A. Witkin and D. Terzopoulos, "Snakes: Active Contour Models," International Journal of Computer Vision, pp. 321-331, 1988.

DISCLOSURE OF THE INVENTION

Problem to be Solved by the Invention

However, there is a problem in that the feature amount that can be calculated with the apparatus of Patent Document 1 stays only in the morphological features of the cell, making it impossible to capture the state of the nuclear DNA which is biologically important.

Means for Solving Problem

According to the present invention, there is provided a cell feature amount calculating apparatus including: an image input unit that inputs an image of a cell; a cell nucleus region extracting unit that extracts a cell nucleus region of the cell from the image; a standard contour length calculating unit that calculates a standard contour length of the cell nucleus region; a contour length sequence calculating unit that extracts, for each threshold value of a plurality of different threshold values, a specific region which is a region having a pixel value larger than or equal to the threshold value from the cell nucleus region, and calculates a contour length sequence by calculating a contour length of the specific region; and a contour complexity calculating unit that calculates a feature amount of the cell based on the standard contour length and the contour length sequence.

Also, according to the present invention, there is provided a cell feature amount calculating method including: inputting an image of a cell; extracting a cell nucleus region of said cell from said image; calculating a standard contour length of said cell nucleus region; extracting, for each threshold value of a plurality of different threshold values, a specific region which is a region having a pixel value larger than or equal to said threshold value from said cell nucleus region and calculating a contour length sequence by calculating a contour length of the specific region; and calculating a feature amount of said cell based on said standard contour length and said contour length sequence.

In the present invention, a standard contour length of a cell nucleus region is calculated. Further, a contour length of the specific region is calculated for each of a plurality of threshold values that are different from each other. By doing so, a contour length sequence which is a set of the contour lengths is calculated. Then, based on these standard contour length and contour length sequence, the feature amount of the cell is calculated. Therefore, according to the present invention, the state of the nuclear DNA can be quantitated at a high precision.

BRIEF DESCRIPTION OF THE DRAWINGS

FIG. 6($a$) is an example of a cell nucleus image of a cell belonging to the target. FIG. 6($b$) is an example of a cell nucleus image of a cell belonging to the control group.

FIGS. 7($a$) to 7($f$) are images for describing a procedure of correctly extracting a nuclear region from a cell nucleus image containing a noise.

FIG. 8($a$) is an example in which a cell nucleus region is extracted. FIG. 8($b$) is an example in which a contour of the cell nucleus region is extracted.

FIG. 9($a$) is a view illustrating a nuclear region when a threshold value is set to be 142. FIG. 9($b$) is a view illustrating a contour of the nuclear region when a threshold value is set to be 142.

FIG. 10($a$) is an example of a contour length sequence generated from a cell nucleus image of a cell belonging to the target. FIG. 10($b$) is an example of a contour length sequence generated from a cell nucleus image of a cell belonging to the control group.

BEST MODE FOR CARRYING OUT THE INVENTION

Hereafter, with reference to the drawings, preferable embodiments of the present invention will be described in detail. Here, in all of the drawings, constituent elements having the same function will be denoted with the same symbols, and the detailed description thereof will be suitably omitted so as not to be duplicated.

(First Embodiment)

In the following embodiments, description will be given by taking, as an example, a case in which a gray scale image where the dyed region of the cell nucleus is represented by a brightness value is an input image. Also, it is assumed that the brightness value is represented by values from 0 to 255. In other cases, for example, even when a color image where images of the nucleus and the chromosome are captured by channels different in RGB is an input, a procedure similar to the method described below can be executed by using, as an object, only the channel in which the image of the cell nucleus is captured.

Also, the present embodiment will use, as an example of an input image, an image in which the cell nucleus dyed by fluorescent staining is observed under a fluorescence microscope. However, even by the other staining technique or image-capturing method, a procedure similar to the method described below can be executed as long as the image is such that the state within the cell nucleus is displayed as a thickness in gray scale.

Figure 1:
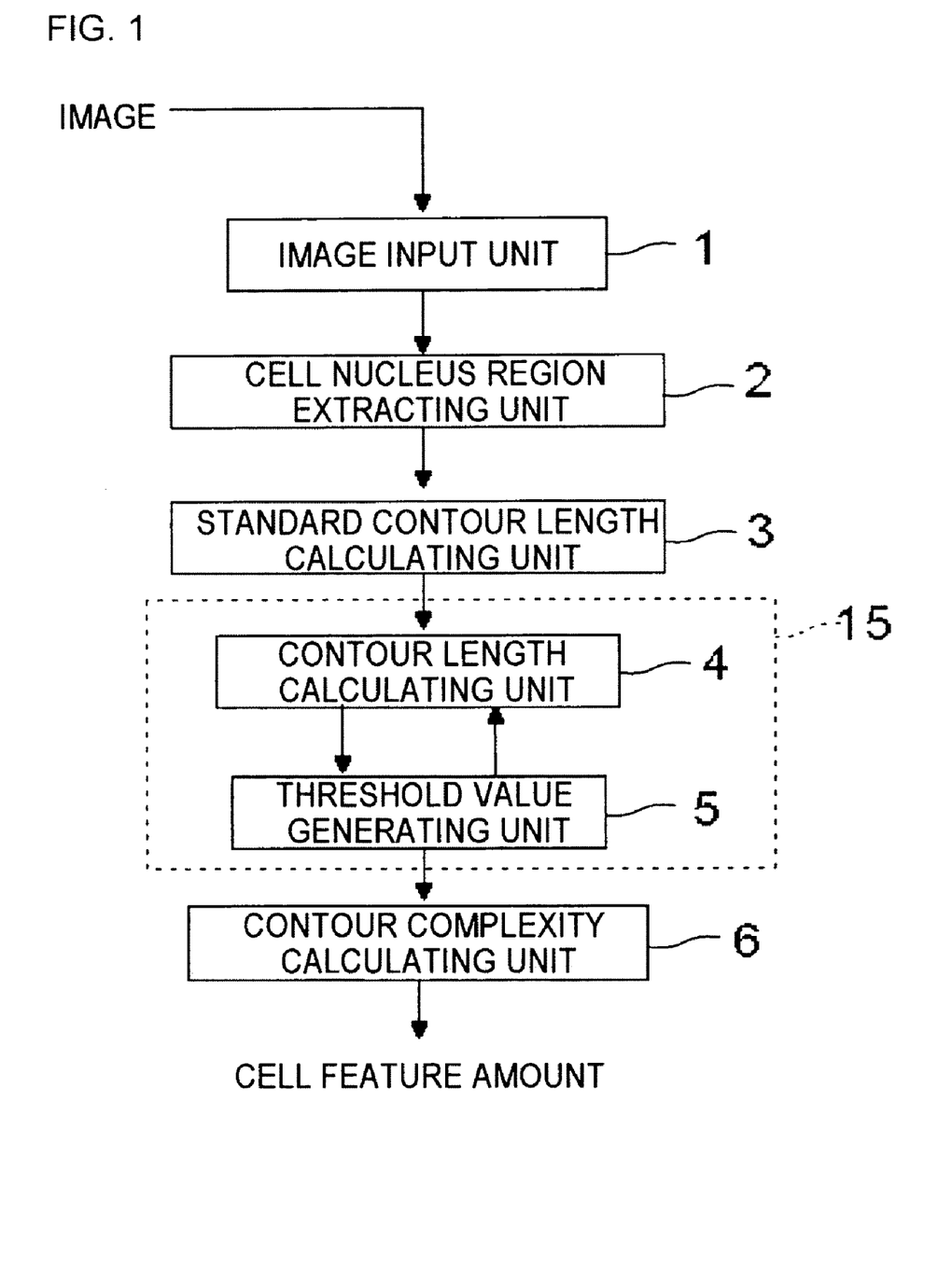
FIG. 1 is a block diagram illustrating a first embodiment of a cell feature amount calculating apparatus according to the present invention.

FIG. 1 is a block diagram illustrating the first embodiment of a cell feature amount calculating apparatus according to the present invention. A cell feature amount calculating apparatus according to the present embodiment includes an image input unit 1 that inputs an image of a cell; a cell nucleus region extracting unit 2 that extracts a cell nucleus region of the cell from the image; a standard contour length calculating unit 3 that calculates a standard contour length of the cell nucleus region; a contour length sequence calculating unit 15 that extracts, for each threshold value of a plurality of different threshold values, a specific region which is a region having a pixel value larger than or equal to the threshold value from the cell nucleus region, and calculates a contour length sequence by calculating a contour length of the specific region; and a contour complexity calculating unit 6 that calculates a feature amount of the cell based on the standard contour length and the contour length sequence.

In the present embodiment, the contour length sequence calculating unit 15 includes a contour length calculating unit 4 and a threshold value generating unit 5 that generates the threshold value to be given to the contour length calculating unit 4. The contour length calculating unit 4 calculates the contour length of the specific region based on the threshold value given from the threshold value generating unit 5. The threshold value generating unit 5 generates the threshold value by changing a value successively by a predetermined amount of increment from a predetermined minimum value to a predetermined maximum value.

Figure 2:
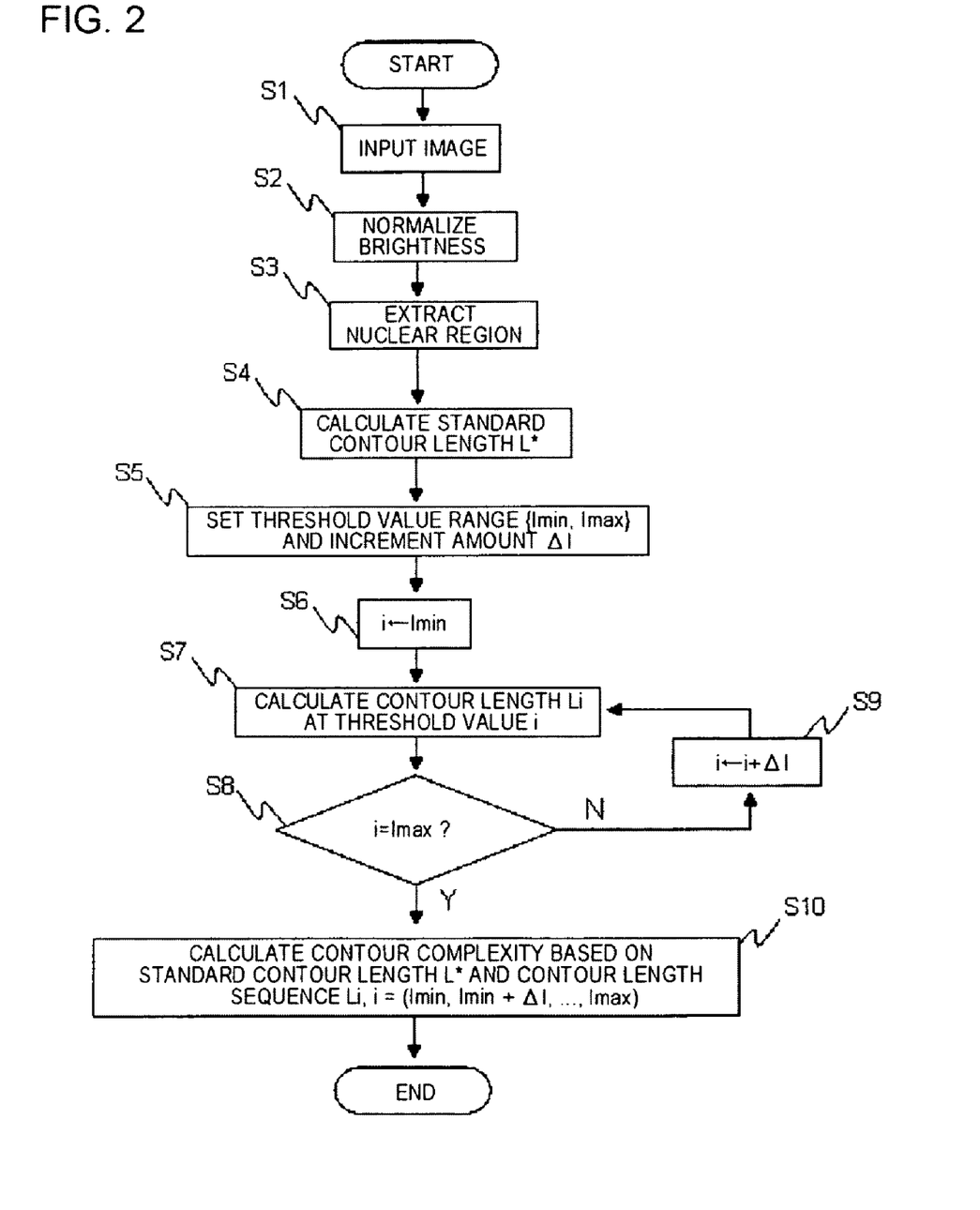
FIG. 2 is a flowchart showing a first embodiment of a cell feature amount calculating method according to the present invention.

With reference to FIG. 2, one example of an operation of the cell feature amount calculating apparatus of FIG. 1 will be described as a first embodiment of a cell feature amount calculating method according to the present invention. To sum up, this method includes: inputting an image of a cell; extracting a cell nucleus region of said cell from said image; calculating a standard contour length of said cell nucleus region; extracting, for each threshold value of a plurality of different threshold values, a specific region which is a region having a pixel value larger than or equal to said threshold value from said cell nucleus region and calculating a contour length sequence by calculating a contour length of the specific region; and calculating a feature amount of said cell based on said standard contour length and said contour length sequence.

In more detail, the image input unit 1 reads an image data (step S1). This image data may be an image containing at least one cell nucleus. Also, a plurality of images containing a cell nucleus may be used as an input image. After reading the image, the image input unit 1 sends the image to the cell nucleus region extracting unit 2. An example of the input image in the present embodiment will be given in FIG. 6(a) and FIG. 6(b).

Figure 6:
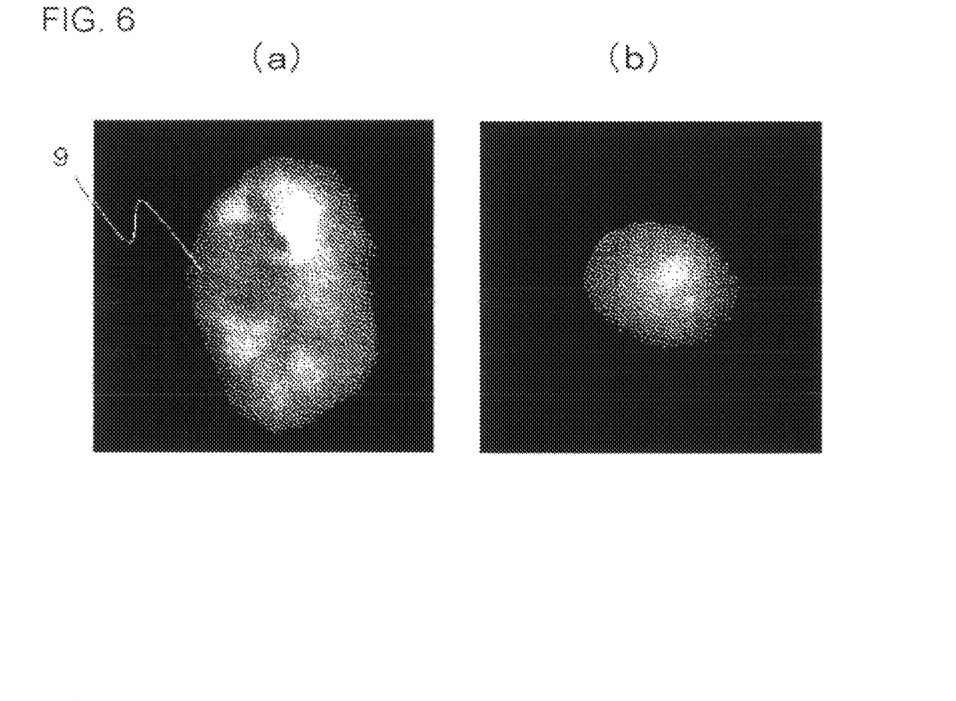

FIG. 6(a) is an example of a cell nucleus image of a cell picked up from a tissue of a malignant tumor. Also, FIG. 6(b) is an example of a cell nucleus image of a cell picked up from a tissue of a benign tumor. Each of the cell nucleus 9 has been dyed by the fluorescent staining method called the DAPI (4',6-diamidino-2-phenylindole) staining method. A large feature of the present embodiment lies in that how the inside of the nucleus is dyed can be quantitated from such a dyed image, whereby the state of the nuclear DNA can be captured.

It is known that, in a malignant tumor, a cell that has undergone mutation proliferates in an abnormal manner. In the inside of such a cell, the duplication and the transcription of the gene is considered to be taking place more actively than in a normal cell. When this is viewed from the viewpoint of images, it is expected that the agglomerated and non-agglomerated parts of the DNA can be observed as an unevenness of the staining. According to the present embodiment, the degree of this unevenness of the staining can be quantified, whereby the state of the DNA in the cell nucleus can be obtained.

The cell nucleus region extracting unit 2 normalizes the brightness value of the input image (step S2), and then extracts the region of the cell nucleus (step S3). The normalization of the brightness value is carried out so that the maximum value of the brightness within the input image will be 255, for example. By this normalization, in the case of comparing the feature amounts among different cells, the influence of the difference in brightness caused by the image-capturing condition can be alleviated.

In order to extract the cell nucleus region, it can be made, for example, by regarding a region which assumes a brightness value larger than or equal to a given threshold value as a nuclear region and by regarding the other region as an outside. In the event that a suitable threshold value is unknown or unclear, for example by normalizing the sum of the brightness values on the image to be 1 and by regarding the image to be a two-dimensional random field thereby determining a suitable threshold value, region extraction can also be made. The region extraction using the random field is disclosed, for example, in the Patent Document 2.

However, when a noise is contained in the input image, it is difficult to extract the cell nucleus region by the above-described method. In such a case, the nucleus region can be extracted correctly from a cell nucleus image containing a noise by using the following method.

Figure 5:
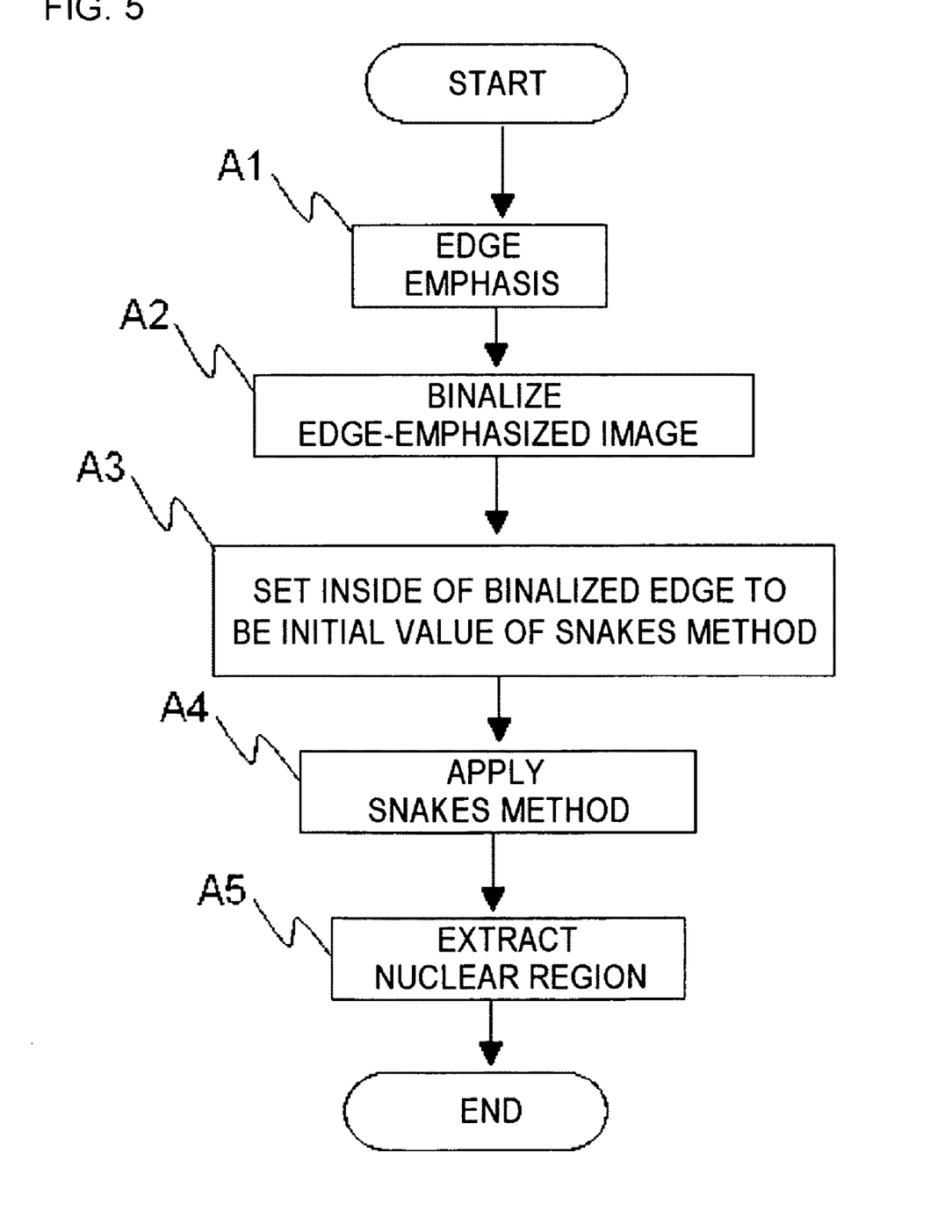
FIG. 5 is a flowchart showing a processing procedure of region extraction of a cell nucleus in the first embodiment.

FIG. 5 shows the flow of the process. According to FIG. 5, first an edge-emphasizing process is carried out on an input image (step A1), and the obtained edge-emphasized image is binalized (step A2). Next, the line in the inside of the binalized edge is set as an initial value of the SNAKES method (step A3). Using the initial value obtained in this manner as a source, the SNAKES method is applied (step A4). Finally, the inside of the contour line obtained by the SNAKES method is extracted as the cell nucleus region (step A5).

Here, the SNAKES method is one kind of a contour extraction method using a dynamic contour model (SNAKES) that is proposed in the Non-Patent Document 1 (M. Kass, A. Witkin and D. Terzopoulos, "Snakes: Active Contour Models," International Journal of Computer Vision pp. 321-331, 1988). In this SNAKES method, a contour represented by a closed curve is assumed in an image, and the energy that the contour itself has, the energy generated between the contour and the image, and the energy by a coercive power from the outside are defined. A region is extracted by deforming the contour so that the sum of these energies may attain the minimum. In the present embodiment, the line inside the binalized edge is used as a "contour" of the SNAKES method. The contents of the Non-Patent Document 1 are incorporated herein by reference as a part of the present specification.

Figure 7:
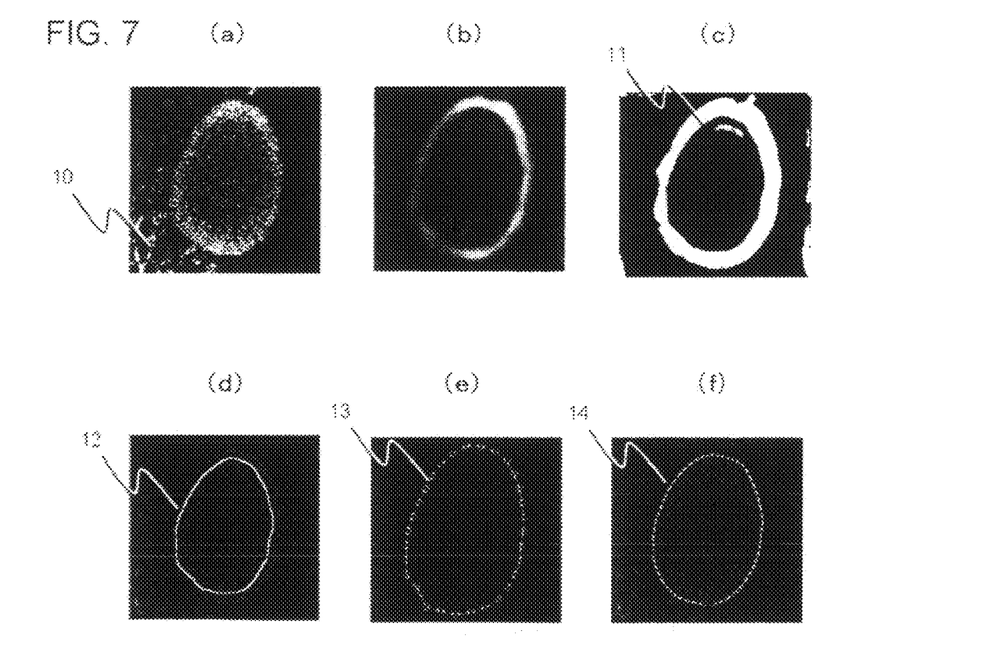

The images in the above-described processing steps will be shown in FIGS. 7(a) to 7(f). In FIG. 7(a), a noise 10 is contained in the image. The brightness of this noise may in some cases be as strong as that of the nuclear region, thereby raising a problem in that, when a simple region extraction method is applied, it may be extracted as the nuclear region erroneously. FIG. 7(b) is a view in which the input image is subjected to an edge-emphasizing process, and FIG. 7(c) is a view in which the edge-emphasized image is binalized. Referring to FIG. 7(c), the line 11 in the inside of the binalized edge has a smaller influence of the noise though the influence of the noise remains on the outside of the cell nucleus.

Next, FIG. 7(d) is a view in which this inside line is extracted, and FIG. 7(e) is a view in which an initial value of SNAKES is generated based on the inside line 12. The initial value 13 of the SNAKES method obtained based on the inside line 11 of the binalized edge is shown in FIG. 7(e). With the initial value 13 obtained in this manner, a shape close to the shape of the object cell nucleus can be obtained without being affected by the noise, so that the contour 14 of the cell nucleus region can be easily obtained by applying an ordinary SNAKES method (FIG. 7(f)). The inside of the contour 14 obtained in this manner may be extracted as a region within the cell nucleus.

Figure 8:
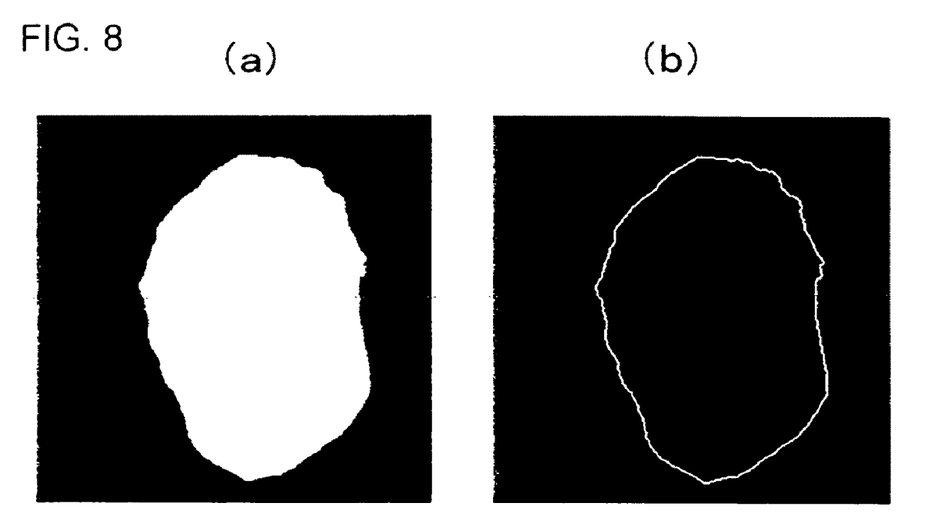

An example of the cell nucleus extracted by the cell nucleus region extracting unit 2 is shown in FIG. 8(a). In the following, the extracted nuclear region is represented as an image assuming, for example, that the brightness value of the region belonging to the nuclear region is 255 and the region other than that to be 0. However, the process can be executed in a similar manner even if the inside and the outside of the region are represented using values other than those. The cell nucleus region extracting unit 2 sends the extracted nuclear region to the standard contour length calculating unit 3.

The standard contour length calculating unit 3 calculates a standard contour length based on the extracted nuclear region (step S4). Here, the standard contour length is defined as a circumference of a disk having the same area as the extracted nuclear region. Assuming that the area of the nuclear region is S, the standard contour length L* is given by the following formula (1).

[Numerical Expression 1]

$$L^* = 2\sqrt{\pi S} \qquad (1)$$

In the present embodiment, the cell feature amount is calculated based on the contour length of the cell nucleus. This contour length increases as the size of the cell nucleus increases. This raises a problem in that the influence of the cell nucleus size is incorporated into the feature amount. Since the size itself of the cell nucleus is an important feature amount, it is desirable that the feature amount quantitated in the present embodiment and the cell nucleus size are treated as independent features in order to capture the features of the cell more accurately.

In the present embodiment, by normalizing the contour length using this standard contour length as a reference value, an effect of enhancing the independence of the feature amount quantitated in the present embodiment and the cell nucleus size can be produced. The standard contour length calculating unit 3 sends the calculated standard contour length to the contour length calculating unit 4. The contour length calculating unit 4 receives a threshold value i that is sent from the threshold value generating unit 5, extracts a region (hereafter denoted as region i) by using the threshold value i and extracting the points within the nucleus having a brightness larger than or equal to the threshold value, and calculates the length of the contour line of this region i. The process flow is as follows.

First, the contour length calculating unit 4 makes a request for the value of the threshold value i to the threshold value generating unit 5. The threshold value generating unit 5 sets a range of the threshold value $[I_{min}, I_{max}]$ and the amount of increment $\Delta I$ (step S5). Then, by firstly setting the threshold value to be $i=I_{min}$, the threshold value generating unit 5 sends the value to the contour length calculating unit 4 (step S6). For the range of the threshold values and the amount of increment, values such as $I_{min}=0$, $I_{max}=255$, and $\Delta I=1$, are used here for example; however, other values may be used as well. Also, an example is shown here in which the value is incremented from the minimum value $I_{min}$ to the maximum value $I_{max}$. Conversely, the value may be decremented from the maximum value $I_{max}$ to the minimum value $I_{min}$.

Figure 9:
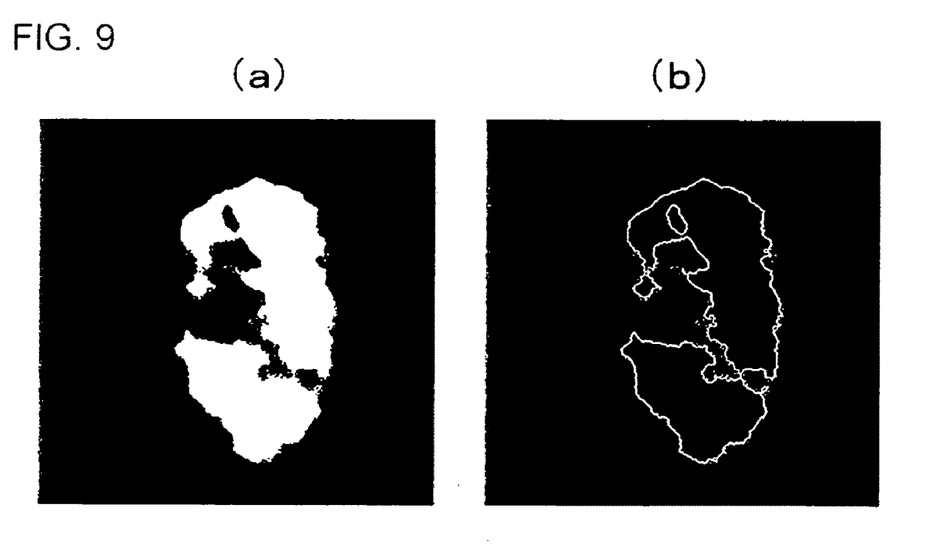

The contour length calculating unit 4 first extracts the nuclear region having a brightness larger than or equal to the threshold value based on the given threshold value i. For example, the nuclear region that is extracted when the threshold value is set to be 142 is shown in FIG. 9(a). Next, the contour length $L_i$ is determined from this nuclear region and sent to the threshold value generating unit 5. The threshold value generating unit 5 holds this. The contour line extracted when the threshold value is set to be i=0 is shown in FIG. 8(b). The contour line extracted when the threshold value is set to be 142 is shown in FIG. 9(b). Here, when a plurality of contour lines are present as in FIG. 9(b), the sum of the contour lengths thereof is set as the contour length Li.

Next, the threshold value generating unit 5 examines whether the current threshold value i has reached the maximum value or not (step S8) and, when the threshold value has reached the maximum value, it sends the standard contour length and the obtained contour length sequence $\{L_0, L_1, \ldots, L_{255}\}$ to the contour complexity calculating unit 6, whereas when the threshold value is less than the maximum value, it increments the threshold value by $\Delta I$ (step S9) and sends the value thereof to the contour length calculating unit 4.

Figure 10:
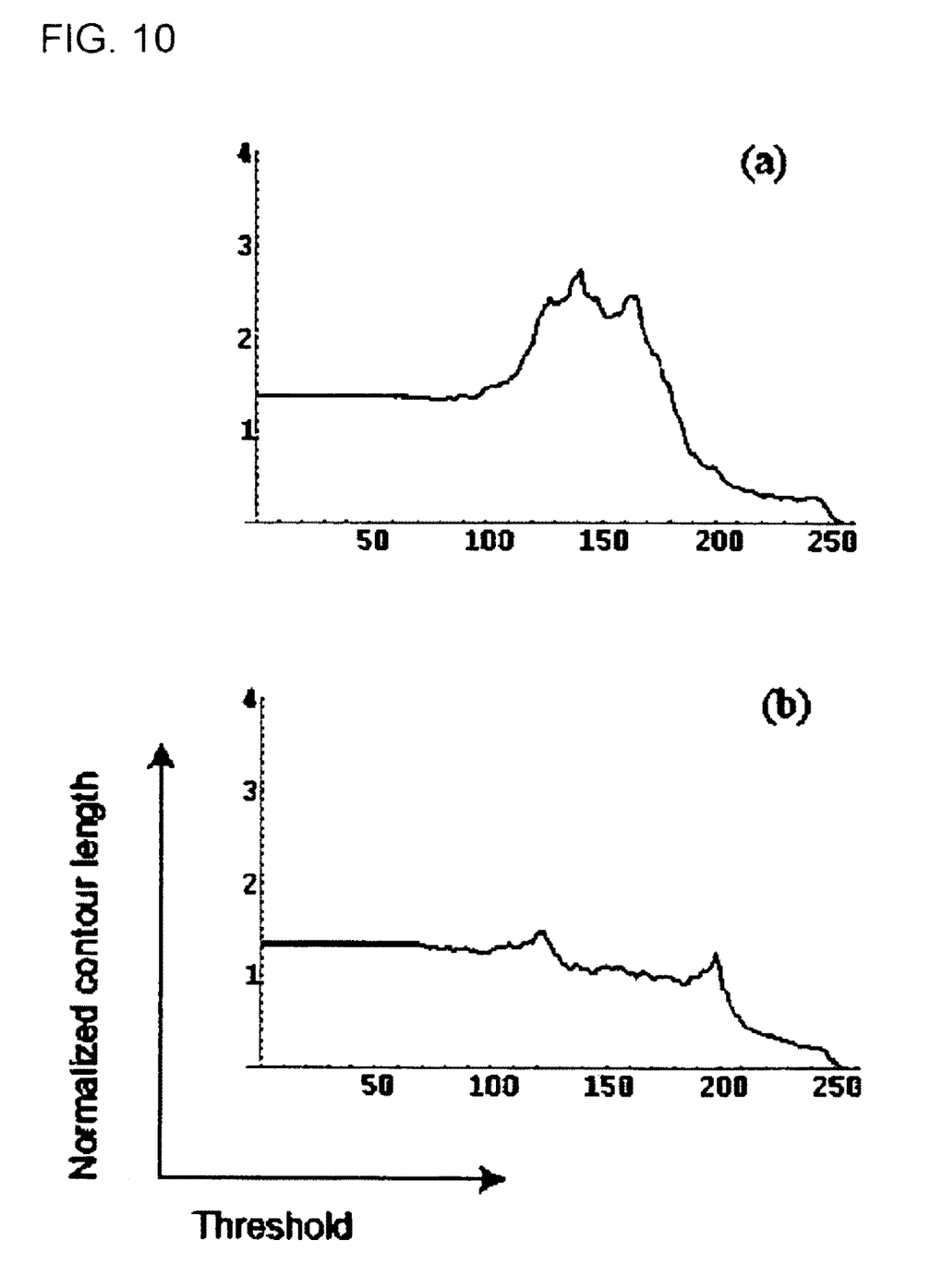

FIGS. 10(a) and 10(b) show the contour length sequences obtained in this manner by representation as graphs. FIG. 10(a) shows a contour length sequence obtained from the cells of a malignant tumor shown in FIG. 6(a). FIG. 10(b) shows a contour length sequence obtained from the cells of a benign tumor shown in FIG. 6(b). In the drawings, the lateral axis corresponds to the threshold values (0 to 255), and the longitudinal axis corresponds to the values obtained by dividing the contour lengths for the respective threshold values by the standard contour length. These Figures seem to reflect a manner of the unevenness in the inside of the cell nucleus, namely the difference of the degree of the agglomeration and non-agglomeration of the DNA.

The contour complexity calculating unit 6 receives the standard contour length and the contour length sequence from the contour length sequence calculating unit 15, and calculates a contour complexity (step S10). In the present specification, the feature amount that is calculated from the standard contour length and the contour length sequence is called a contour complexity. The contour complexity C can be determined as a sum of the selected contour lengths by selecting only the contour lengths larger than or equal to the standard contour length from the contour length sequence, as shown in the following formula (2), for example.

[numerical expression 2]

$$C = \sum_i (L_i - L^*) I_{\{L_i > L^*\}} \quad (2)$$

Here, $L_i$ represents a contour length obtained by setting the threshold value to be i; $L^*$ represents the standard contour length; and the symbol $I_{\{A\}}$ is 1 when the condition A is satisfied, and is 0 otherwise.

Figure 11:
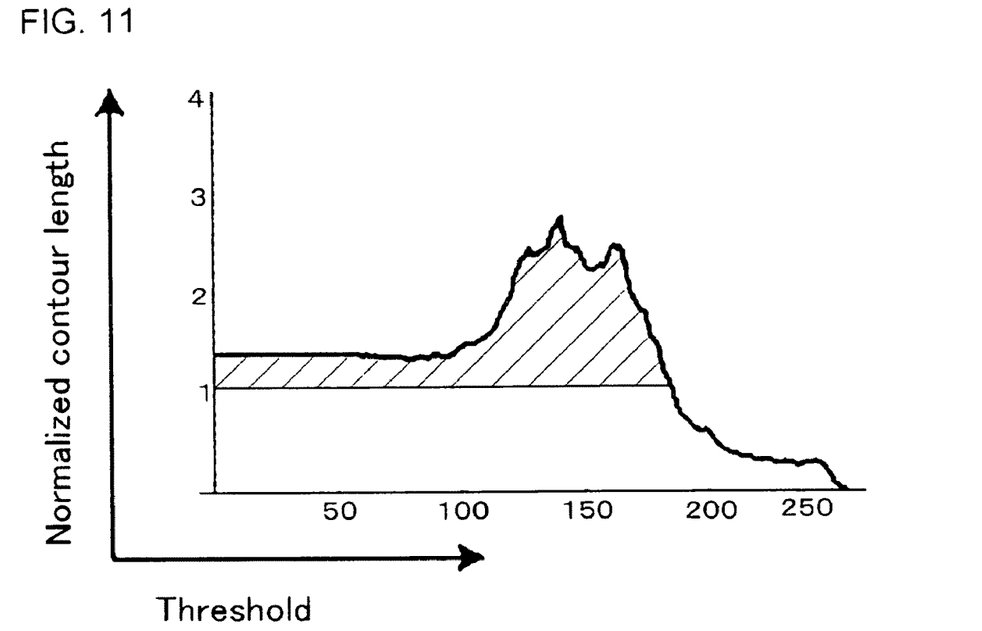
FIG. 11 is a view illustrating one example of an area corresponding to the cell feature amount that is calculated by the contour complexity calculating unit (cell feature amount calculating unit).

In FIG. 11, the hatched part corresponds to the above-described contour complexity. However, in FIG. 11, the contour lengths belonging to the contour length sequence are normalized by being divided by the standard contour length.

Besides this, for the contour complexity C, a sum of the square of the differences may be used as shown in the following formula (3), for example.

[numerical expression 3]

$$C = \sum_i (L_i - L^*)^2 I_{\{L_i > L^*\}} \quad (3)$$

In the present embodiment, the contour complexity may be determined by using a base line value calculated from a subsequence of the contour length sequence as a standard. Here, as the base line value $L_B$, an average value or the like of the first M terms of the contour length sequence may be used as shown in the following formula (4), for example.

[numerical expression 4]

$$L_B = \sum_{i=0}^{M-1} L_i / M \quad (4)$$

Here, M may be a value such as 10; however, it is sufficient that M is a value such that the initial subsequence in which the variation of the contour length is small is contained.

Also, as the contour complexity C, a complexity obtained by taking a sum using the base line value as a standard may be used, as shown in the following formula (5).

[numerical expression 5]

$$C = \sum_i (L_i - L_B) I_{\{L_i > L_B\}} \quad (5)$$

Figure 12:
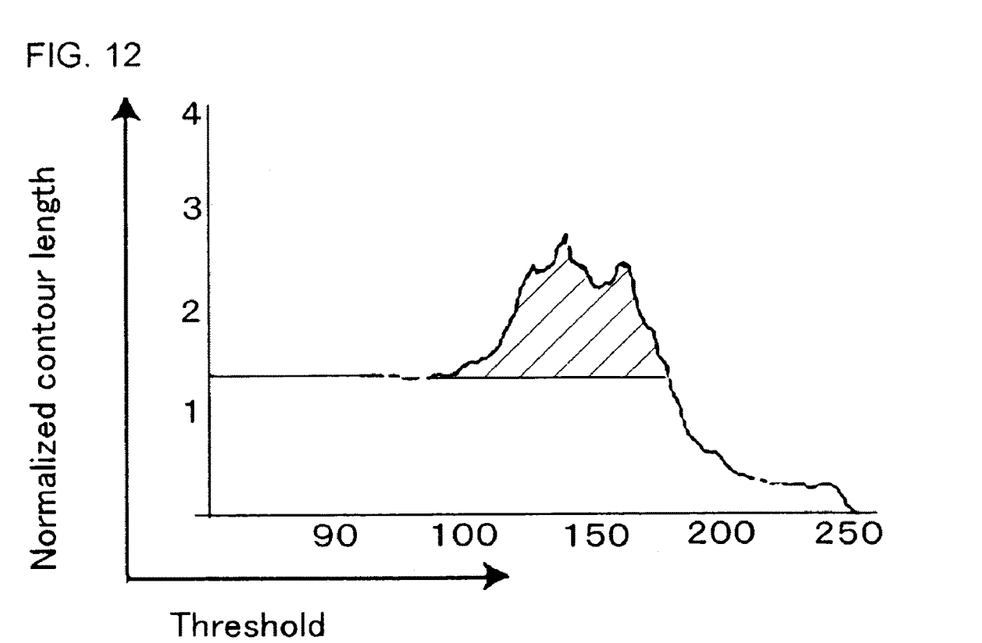
FIG. 12 is a view illustrating another example of an area corresponding to the cell feature amount that is calculated by the contour complexity calculating unit (cell feature amount calculating unit).

In FIG. 12, the hatched part corresponds to the above-described contour complexity. However, in FIG. 12, the contour lengths belonging to the contour length sequence are normalized by being divided by the standard contour length.

Alternatively, as shown in the following formula (6), a complexity obtained by taking a sum of the squares using the base line value as a standard may be used.

[numerical expression 6]

$$C = \sum_i (L_i - L_B)^2 I_{\{L_i > L_B\}} \quad (6)$$

Here, depending on the cases, it is possible to simply calculate a total sum or a sum of the squares of the contour length sequence by assuming the base line value to be 0 in the above-described calculating method.

In the above-described calculation of the feature amount, it is possible to use a normalized contour length by dividing each contour length belonging to the contour length sequence by the standard contour length. By this normalization, the influence of the cell nucleus size on the feature amount calculated in the present embodiment can be eliminated.

(Second Embodiment)

Next, the second embodiment of the present invention will be described with reference to the attached drawings. In the embodiment described below, the description of the parts that overlap with those of the previously described first embodiment will be omitted.

Figure 3:
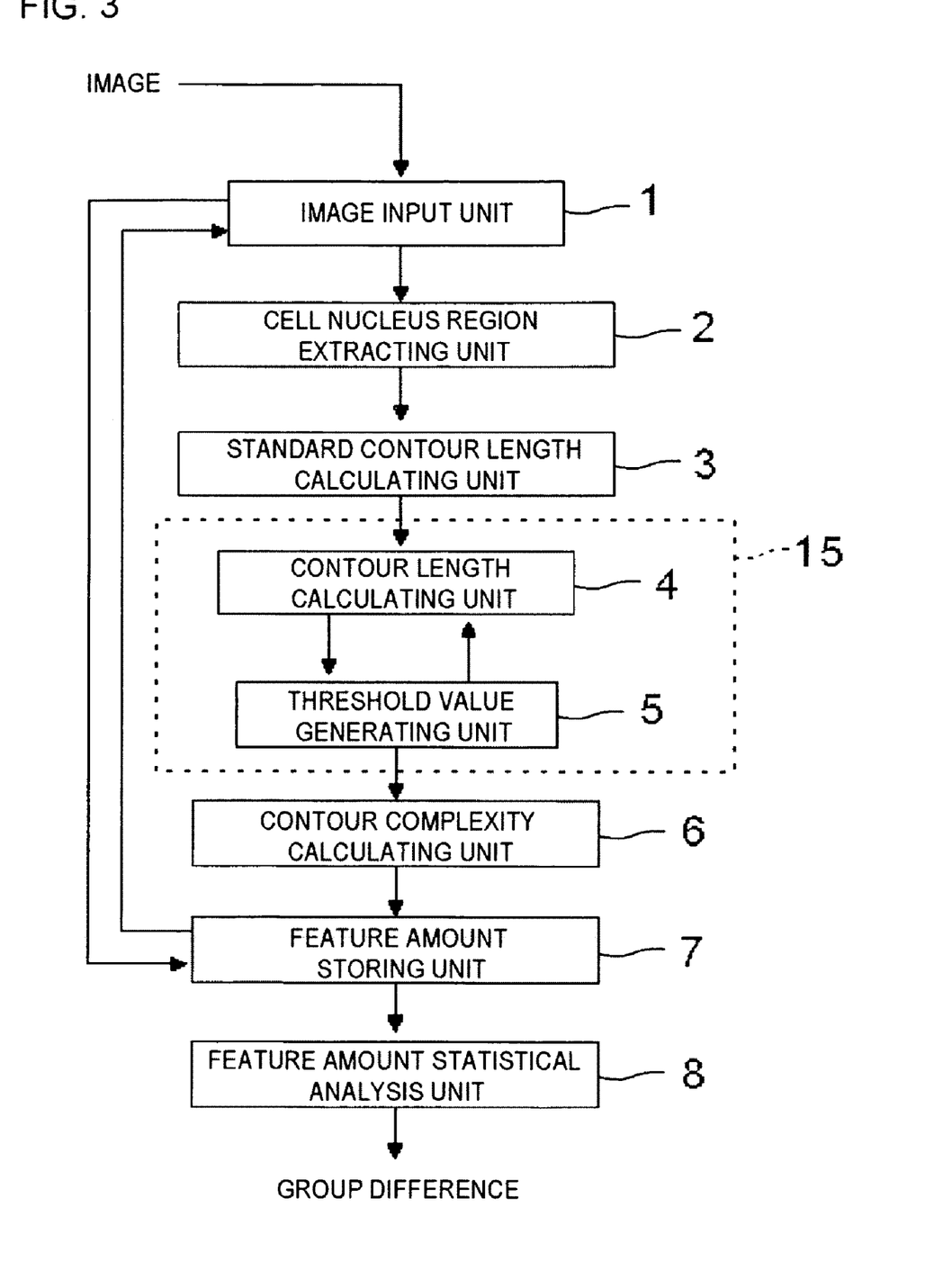
FIG. 3 is a block diagram illustrating a second embodiment of a cell feature amount calculating apparatus according to the present invention.
Figure 4:
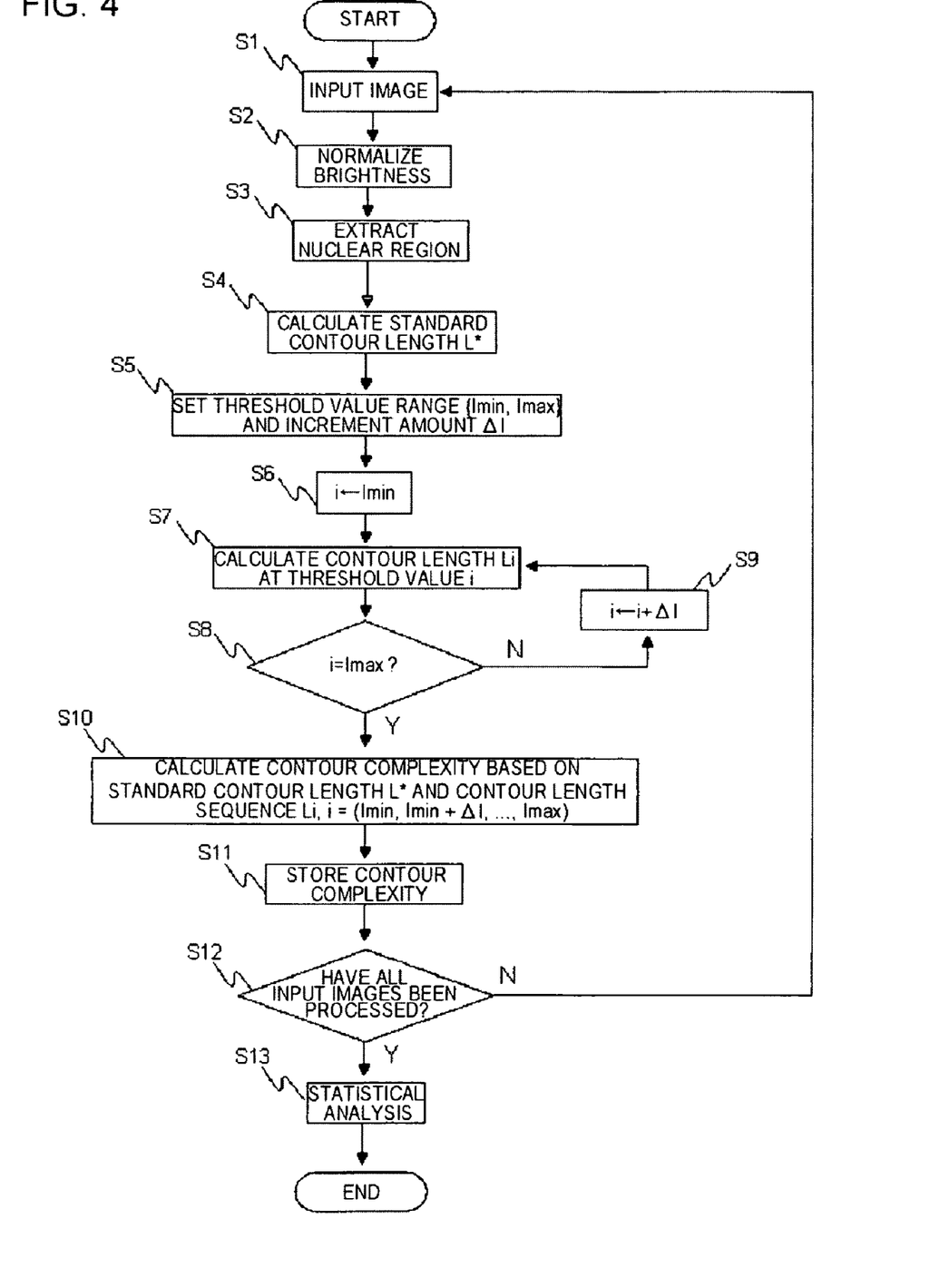
FIG. 4 is a flowchart showing a second embodiment of a cell feature amount calculating method according to the present invention.

FIG. 3 is a block diagram illustrating the second embodiment of a cell feature amount calculating apparatus according to the present invention. Also, FIG. 4 is a flowchart showing the second embodiment of a cell feature amount calculating method according to the present invention.

The cell feature amount calculating apparatus according to the present embodiment includes a feature amount storing unit 7 and a feature amount statistical analysis unit 8 in addition to an image input unit 1, a cell nucleus region extracting unit 2, a standard contour length calculating unit 3, a contour length calculating unit 4, a threshold value generating unit 5, and a contour complexity calculating unit 6. The operations of the image input unit 1, the cell nucleus region extracting unit 2, the standard contour length calculating unit 3, the contour length calculating unit 4, the threshold value generating unit 5, and the contour complexity calculating unit 6 are the same as in the first embodiment.

The feature amount storing unit 7 receives a contour complexity from the contour complexity calculating unit 6, and holds this (step S11). Next, the feature amount storing unit 7 examines whether there is an unprocessed image (step S12), and if there are no more input images, it sends all of the contour complexities that it holds to the feature amount statistical analysis unit 8. If there are unprocessed input images, it makes a request for the next image to the image input unit 1.

The feature amount statistical analysis unit 8 receives the contour complexity from the feature amount storing unit 7, and calculates a statistical difference among given cell nucleus groups (step S13). As a method for calculating a statistical difference, the known Kolmogorov-Smirnov assay may be used. Alternatively, the known Mann-Whitney assay maybe used. Still alternatively, the known Wilcoxson assay may be used. Besides these, it is possible to adopt a similar method as long as it is a method that can calculate a statistical difference among groups.

Figure 13:
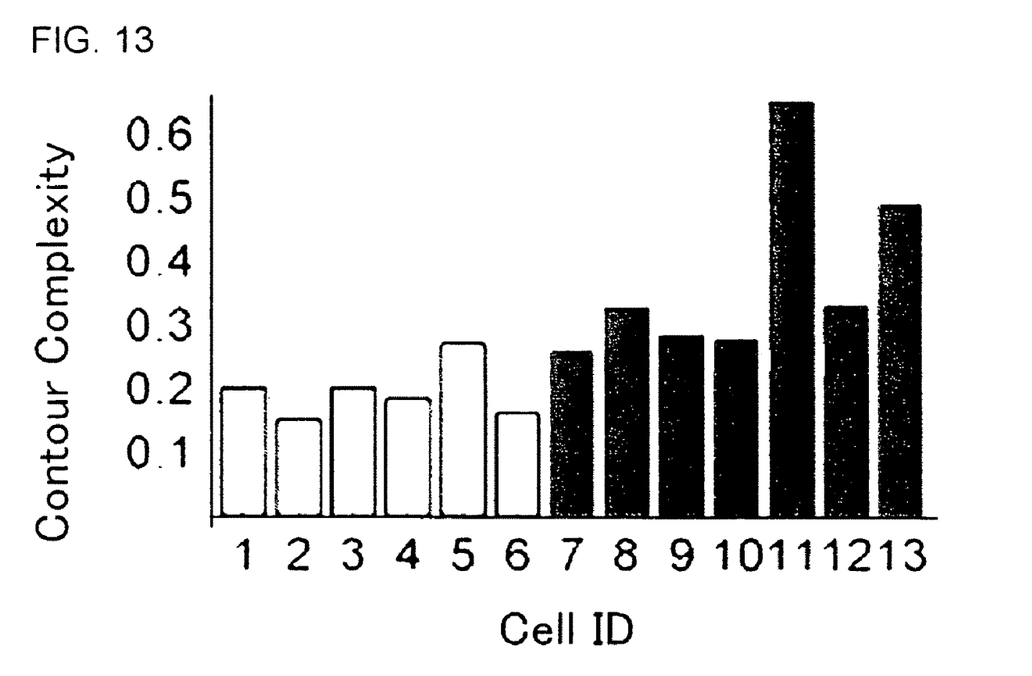
FIG. 13 is a view showing a result of calculating the cell feature amount with respect to the cells of the control group (cell number 1 to 6) and the target group (cell number 7 to 13).

FIG. 13 shows feature amounts according to the present embodiment obtained from 7 cells of a target group (cell group of a malignant tumor) and 6 cells of a control group (cell group of a benign tumor). In FIG. 13, the lateral axis represents the cell number, and the longitudinal axis represents a value obtained by dividing the feature amount described in the formula (2) by the number of the contour length sequence (here, 256). Each contour length is normalized by being divided by the standard contour length. The cell numbers 1 to 6 represent the control group (cell group of a benign tumor), and the cell numbers 7 to 13 represent the target group (cell group of a malignant tumor).

As will be understood from FIG. 13, the feature amount of the present embodiment is clearly larger in the cell group of the malignant tumor. Actually, when the Kolmogorov-Smirnov assay is carried out, it has been shown that the two groups have significantly different feature amounts (the P-value is 0.008159).

As described above, according to the present embodiment, the state of the nuclear DNA can be quantitated at a high precision based on the cell images, particularly the images of the cell nucleus subjected to fluorescent staining.

As shown above, the invention of the present application has been described with reference to the embodiments; however, the invention of the present application is not limited to the above-described embodiments. On the constructions and details of the invention of the present application, various changes that those skilled in the art may understand can be made within the scope of the invention of the present application.

Also, this application claims the priority based on the Japanese Patent Application No. 2007-032490 that was filed on 13 Feb. 2007, all of the disclosure of which are incorporated herein by reference as a part of the present specification.

The invention claimed is:

1. A cell feature amount calculating apparatus comprising:
   an image input unit that inputs an image of a cell;
   a cell nucleus region extracting unit that extracts a cell nucleus region of said cell from said image;
   a standard contour length calculating unit that calculates a standard contour length of said cell nucleus region;
   a contour length sequence calculating unit that extracts, for each threshold value of a plurality of different threshold values, a specific region which is a region having a pixel value larger than or equal to said threshold value from said cell nucleus region, and calculates a contour length sequence by calculating a contour length of the specific region; and
   a contour complexity calculating unit, comprising a processor, that calculates a feature amount of said cell based on said standard contour length and said contour length sequence; wherein said contour complexity calculating unit selects only said contour lengths having lengths larger than or equal to said standard contour lengths from said contour length sequence, and calculates a sum of the differences of said selected contour lengths and said standard contour lengths as said feature amount.

2. The cell feature amount calculating apparatus according to claim 1, wherein
   said contour length sequence calculating unit includes a contour length calculating unit and a threshold value generating unit that generates said threshold value to be given to said contour length calculating unit;
   said contour length calculating unit calculates said contour length of said specific region based on said threshold value given from said threshold value generating unit; and
   said threshold value generating unit generates said threshold value by changing a value successively by a predetermined amount of change within a predetermined range.

3. The cell feature amount calculating apparatus according to claim 1,
   wherein said contour complexity calculating unit selects only said contour length having a length larger than or equal to said standard contour length from said contour length sequence, and calculates a sum of the square of the difference of said selected contour length and said standard contour length as said feature amount.

4. The cell feature amount calculating apparatus according to claim 1,
   wherein said contour complexity calculating unit calculates a base line value from a subsequence of said contour length sequence, selects only said contour length having a length larger than or equal to the base line value from said contour length sequence, and calculates a sum of the difference of said selected contour length and said base line value as said feature amount.

5. The cell feature amount calculating apparatus according to claim 1,
   wherein said contour complexity calculating unit calculates a base line value from a subsequence of said contour length sequence, selects only said contour length having a length larger than or equal to the base line value from said contour length sequence, and calculates a sum of the square of the difference of said selected contour length and said base line value as said feature amount.

6. The cell feature amount calculating apparatus according to claim 1,
   wherein said contour complexity calculating unit calculates said feature amount by using a contour length normalized by dividing said each contour length belonging to said contour length sequence by said standard contour length.

7. The cell feature amount calculating apparatus according to claim 1, further comprising a feature amount storing unit and a feature amount statistical analysis unit,
   wherein
   said image input unit inputs a plurality of images captured from the cells of a cell group of a target group and a plurality of images captured from the cells of a cell group of a control group,
   said contour complexity calculating unit calculates said feature amount for each of the images input into said image input unit,
   said feature amount storing unit holds said feature amounts calculated by said contour complexity calculating unit, and
   said feature amount statistical analysis unit calculates a difference between said target group and said control group based on said feature amounts that are held in said feature amount storing unit.

8. The cell feature amount calculating apparatus according to claim 7,
wherein said feature amount statistical analysis unit calculates said difference by using the Kolmogorov-Smirnov assay.

9. The cell feature amount calculating apparatus according to claim 7,
wherein said feature amount statistical analysis unit calculates said difference by using the Mann-Whitney assay.

10. The cell feature amount calculating apparatus according to claim 7,
wherein said feature amount statistical analysis unit calculates said difference by using the Wilcoxson assay.

11. The cell feature amount calculating apparatus according to claim 1,
wherein said cell nucleus region extracting unit generates an edge-emphasized image from said image, binalizes said edge-emphasized image, and extracts said cell nucleus region by the SNAKES method using an inner region of the binalized edge-emphasized image as an initial value.

12. A cell feature amount calculating method comprising:
inputting an image of a cell;
extracting, via a cell nucleus region extracting unit, a cell nucleus region of said cell from said image;
calculating a standard contour length of said cell nucleus region;
extracting, for each threshold value of a plurality of different threshold values, a specific region which is a region having a pixel value larger than or equal to said threshold value from said cell nucleus region and calculating a contour length sequence by calculating a contour length of the specific region; and
calculating, via a processor, a feature amount of said cell based on said standard contour length and said contour length sequence; wherein said calculating the feature amount of said cell selects only said contour lengths having lengths larger than or equal to said standard contour lengths from said contour length sequence, and calculates a sum of the differences of said selected contour lengths and said standard contour lengths as said feature amount.

13. The cell feature amount calculating method according to claim 12,
wherein calculating the contour length sequence includes calculating a contour length and generating said threshold value to be used in said calculating the contour length,
said calculating the contour length calculates said contour length of said specific region based on said threshold value generated in said generating said threshold value, and
said generating said threshold value generates said threshold value by changing a value successively by a predetermined amount of change within a predetermined range.

14. The cell feature amount calculating method according to claim 12,
wherein said calculating the feature amount of said cell selects only said contour length having a length larger than or equal to said standard contour length from said contour length sequence, and calculates a sum of the square of the difference of said selected contour length and said standard contour length as said feature amount.

15. The cell feature amount calculating method according to claim 12,
wherein said calculating the feature amount of said cell calculates a base line value from a subsequence of said contour length sequence, selects only said contour length having a length larger than or equal to the base line value from said contour length sequence, and calculates a sum of the difference of said selected contour length and said base line value as said feature amount.

16. The cell feature amount calculating method according to claim 12,
wherein said calculating the feature amount of said cell calculates a base line value from a subsequence of said contour length sequence, selects only said contour length having a length larger than or equal to the base line value from said contour length sequence, and calculates a sum of the square of the difference of said selected contour length and said base line value as said feature amount.

17. The cell feature amount calculating method according to claim 12,
wherein said calculating the feature amount of said cell calculates said feature amount by using a contour length normalized by dividing said each contour length belonging to said contour length sequence by said standard contour length.

18. The cell feature amount calculating method according to claim 12, further comprising storing said feature amount and analyzing said feature amount statistically,
wherein
said inputting the image of the cell inputs a plurality of images captured from the cells of a cell group of a target group and a plurality of images captured from the cells of a cell group of a control group,
said calculating the feature amount of said cell calculates said feature amount for each of the images input in said inputting the image of the cell,
said storing said feature amount holds said feature amounts calculated by said contour complexity calculating, and
said analyzing said feature amount statistically calculates a difference between said target group and said control group based on said feature amounts that are held in said feature amount storing.

19. The cell feature amount calculating method according to claim 18, wherein said analyzing said feature amount statistically calculates said difference by using the Kolmogorov-Smirnov assay.

20. The cell feature amount calculating method according to claim 18,
wherein said analyzing said feature amount statistically calculates said difference by using the Mann-Whitney assay.

21. The cell feature amount calculating method according to claim 18,
wherein said analyzing said feature amount statistically calculates said difference by using the Wilcoxson assay.

22. The cell feature amount calculating method according to claim 12,
wherein said extracting the cell nucleus region generates an edge-emphasized image from said image, binalizes said edge-emphasized image, and extracts said cell nucleus region by the SNAKES method using an inner region of the binalized edge-emphasized image as an initial value.

* * * * *